United States Patent
Schuster et al.

(10) Patent No.: US 8,016,587 B2
(45) Date of Patent: Sep. 13, 2011

(54) STRETCH ROD, APPARATUS AND METHOD FOR PRODUCING HOLLOW BODIES

(75) Inventors: Gerhard Schuster, Pfakofen (DE); Peter Knapp, Schmatzhausen (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/337,804

(22) Filed: Dec. 18, 2008

(65) Prior Publication Data

US 2009/0160102 A1 Jun. 25, 2009

(30) Foreign Application Priority Data

Dec. 18, 2007 (DE) .......................... 10 2007 061 659

(51) Int. Cl.
*B29C 49/28* (2006.01)
(52) U.S. Cl. .......................... 425/535; 425/529; 425/528
(58) Field of Classification Search .................. 425/528, 425/529, 535
See application file for complete search history.

(56) References Cited

U.S. PATENT DOCUMENTS

| | | | |
|---|---|---|---|
| 3,550,200 A | 12/1970 | Gilbert | |
| 3,882,212 A * | 5/1975 | Edwards | 264/535 |
| 4,039,271 A * | 8/1977 | Hudson et al. | 425/529 |
| 2007/0132160 A1* | 6/2007 | Vieillot | 425/535 |

FOREIGN PATENT DOCUMENTS

| | | |
|---|---|---|
| DE | 2116318 A1 | 11/1972 |
| DE | 102004018146 | 10/2005 |
| EP | 0 324 102 A2 | 7/1989 |
| GB | 2 138 735 A | 10/1984 |
| JP | 52-101265 | 8/1977 |

OTHER PUBLICATIONS

European Search Report and Written Opinion for 08020856 dated May 11, 2009, Written Opinion Only.

* cited by examiner

*Primary Examiner* — Yogendra Gupta
*Assistant Examiner* — Alison Hindenlang
(74) *Attorney, Agent, or Firm* — Marshall, Gerstein & Borun LLP

(57) ABSTRACT

A stretch rod used for forming a preform into a hollow body having in its surface a plurality of raised portions and/or recesses relative to the circular cylinder shape, whereby the stretch rod tip can come into contact with the concave, rotationally symmetric inner surface of the preform at a plurality of locations which are separate from one another. Also, a method and an apparatus for forming a preform into a hollow body, which uses such a stretch rod.

14 Claims, 4 Drawing Sheets

STRETCH ROD, APPARATUS AND METHOD FOR PRODUCING HOLLOW BODIES

CROSS-REFERENCE TO RELATED APPLICATION

The present application claims the benefit of priority of German Patent Application No. 102007061659.9, filed Dec. 18, 2007. The entire text of the priority application is incorporated herein by reference in its entirety.

FIELD OF THE DISCLOSURE

The present disclosure relates to a stretch rod and an apparatus used for forming a preform into a hollow body, and to a method of forming a preform into a hollow body.

BACKGROUND

The prior art, in particular Offenlegungsschrift DE 10 2004 018 146 A1, discloses a method and an apparatus for blow molding containers, in the case of which preforms consisting of a thermoplastic material are first heated to the right temperature within a blow mold and are then, on the one hand, stretched by a stretch rod, and, on the other hand, inflated into containers by supplying compressed air into the interior of the preform. The compressed air is supplied though the stretch rod. In addition, said publication mentions the possibility of discharging compressed gas from the shaped container through the stretch rod and of achieving, in so doing, an additional cooling effect by predetermining suitable flow directions.

In the case of the cited prior art, the material yield is often insufficient in the contact area of the stretch rod tip and of the preform. When high requirements on the container quality and the material yield are to be met, it will, however, be necessary to stretch the material also in this contact area.

SUMMARY OF THE DISCLOSURE

The present disclosure, among other things, relates to the shape of a stretch rod tip. The part of the stretch rod referred to as stretch rod tip is here and in the following the stretch rod end which has to be directed towards the preform. The shape of the stretch rod tip differs from that of a circular cylinder with regard to a plurality of raised portions and/or recesses in the tip surface. The technical effect of the resultant profile is that, even when the stretch rod tip has struck the preform, the preform material will not be not fixed by an immovable contact edge in the contact area with the stretch rod tip, but remain stretchable between the raised portions on the stretch rod tip or in the recesses provided on said stretch rod tip. A continued introduction movement of the stretch rod and the blowing-in of compressed air then have the effect that this interspace material is stretched. By reducing the size of the contact area, the adhesion between the stretch rod tip and the material will be reduced as well, so that the material will be able to slide over the tip edge also in the contact area. Furthermore, the elasticity of the material stretched in the interspaces creates an additional stress in view of which the material slides away below the stretch rod tip. Taking all this into account, the material yield is improved in the area in question in this way.

The raised portions and/or recesses on the stretch rod tip influence the shape of the resultant cross-sections at right angles to the longitudinal axis of the stretch rod. Those raised portions and/or recesses can e.g. be arranged such that polygonal cross-sectional areas are formed. This variant has the advantage that the stretch rod can be produced easily. The words "cross-section" and "cross-sectional area" are used as synonyms in this text.

Cross-sections may also be formed, which comprise a plurality of (e.g. two, three, four, five, six, seven, eight, nine or more) finger faces. Such cross-sections in the contact area between the stretch rod tip and the preform material result in the formation of elongate interspaces at which the stretch rod does not come in contact with the material or applies at least less pressure thereto. In these elongate interspaces, a particularly good stretching of the material can be effected when the introduction movement of the stretch rod is continued. This is especially the case when the finger faces extend radially and/or when each finger is delimited, at least partially, by parallel sides, since the material can then escape particularly easily towards the outside.

When the raised portions on the stretch rod tip have the shape of beads, hemispheres or other partially spherical objects, the material will, at the locations in question, first be contacted neither at points nor along an edge, but over an area, whereupon it will be compressed in a comparatively homogeneous manner. This results in improved sliding and, consequently, in better care of the material. Raised portions in the form of knobs, flanges or projections can be produced comparatively easily on the stretch rod tip.

Also recesses formed by incisions, grooves or holes can easily be produced in the stretch rod tip.

The present disclosure also relates to variants in the case of which the recesses relative to the circular cylinder shape are created by incisions or portions and the resultant cut faces extend in a radial direction (i.e. in a direction at right angles to and towards the longitudinal axis of the stretch rod) and/or in a direction parallel to the longitudinal axis of the stretch rod. These versions are characterized by a comparatively easy production of the stretch rod.

The stretch rod can also partially increase in width towards its tip. This means, more precisely, that the stretch rod tip has at a location a cross-section whose maximum radial edge distance to the longitudinal axis of the stretch rod is larger than the radial edge distance of at least one cross-section of the remaining part of the stretch rod, i.e. the part without the tip. The "maximum radial edge distance" means here the maximum distance between a point at the edge of cross-sectional area and the penetration point of the longitudinal axis of the stretch rod. This version in the case of which the deviation from the circular cylinder shape takes the form of raised portions on the circumferential surface of the circular cylinder can have the advantage that less material will be necessary for producing the stretch rod.

When the stretch rod tip is provided with flattened corners and edges in the area of contact with the preform, this will result in improved sliding of the material on the tip and, consequently, in better care of the material.

Furthermore, one or a plurality of flow paths can be provided in the interior of the stretch rod, said flow paths being used for discharging or feeding compressed gas.

It is also part of the present disclosure that the recesses and/or raised portions in the surface of the stretch rod tip and the outlet or inlet openings of the flow paths are adapted to one another in such a way that said flow paths are extended by the recesses or the space between the raised portions. Each of the resultant extensions is partially delimited by the preform material. The gas stream flowing through (e.g. when compressed gas is discharged) has then a cooling effect at these and at adjacent locations, which leads to a dimensional stability of especially the bottom within a shorter period of time.

In addition, the present disclosure relates to a method of forming a preform into a hollow body, said method comprising the use of a stretch rod of one of the types described hereinbefore. The above-mentioned advantages of such stretch rods are then accomplished in the case of such methods as well.

In particular, the method can be so conceived that the stretch rod tip contacts the preform in the interior thereof while the outer side of said preform strikes against a bottom mold. It follows that the preform material is in contact with the stretch rod as well as the bottom mold simultaneously. This can be utilized e.g. for pressing the material between the contact surfaces on both sides.

A particularly good material yield will be accomplished when the stretch rod has a kind of counter-profile to the profile of the bottom mold, i.e. when the number of raised portions on the tip corresponds to the number of depressions in the bottom mold or when the number of recesses provided on the tip corresponds to the number of raised portions in the bottom mold.

An apparatus for blow molding, which comprises a stretch rod of one of the types described hereinbefore, is also part of the present disclosure; this apparatus then produces the described effects of the respective stretch rod tip provided.

DETAILED DESCRIPTION OF THE PREFERRED EMBODIMENT

Figure 1A:
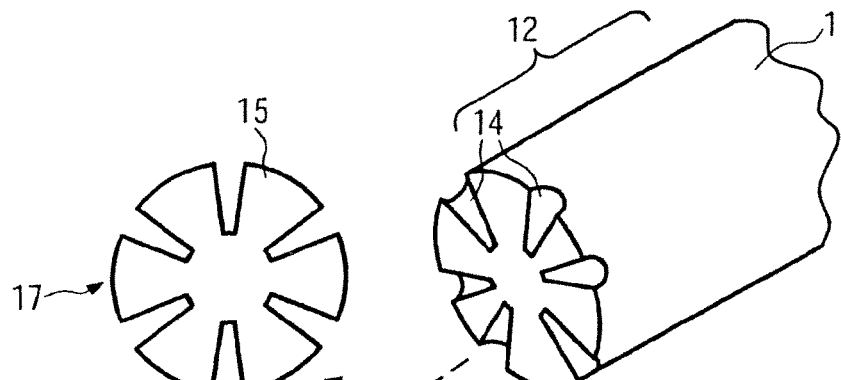
FIG. 1a) to d) shows four variants of raised portions/recesses provided on the stretch rod tip.

FIG. 1a)-d) show four possibilities for profiles of stretch rod tips. In the embodiment shown in FIG. 1a), six uniformly distributed recesses 14 in the form of radial notches are provided. Hence, the stretch rod tip 12 has at (especially) one location a cross-section 17 at right angles to the longitudinal axis of the stretch rod, which comprises six radially outwardly extending fingers 15; this cross-section 17 is shown as well. The width of the fingers increases in a radially outward direction.

Figure 1B:
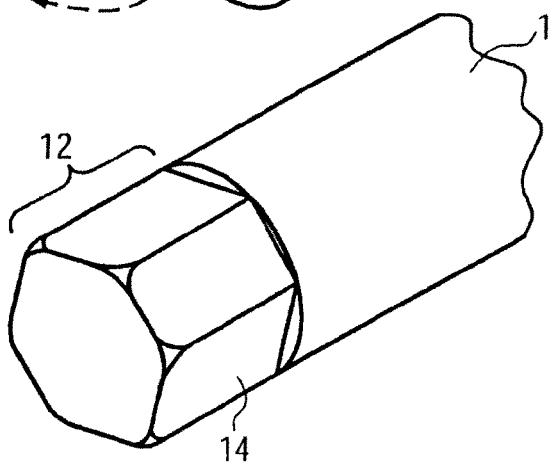

In the case of the stretch rod shown in FIG. 1b), the recesses 14 can, in comparison with the circular cylinder shape, be interpreted as recesses relative to the circumferential surface of a circular cylinder. Due to the portions relative to the circular cylinder shape whose cut faces extend in a direction 23 parallel to the longitudinal axis of the stretch rod, the stretch rod tip has at (especially) one location a polygonal cross-section. The corners are rounded on the face side of the stretch rod. However, the present disclosure may also exclusively relate to recesses which are arranged within the end faces of the stretch rod tip (cf. e.g. FIG. 1a, 1d).

Figure 1C:
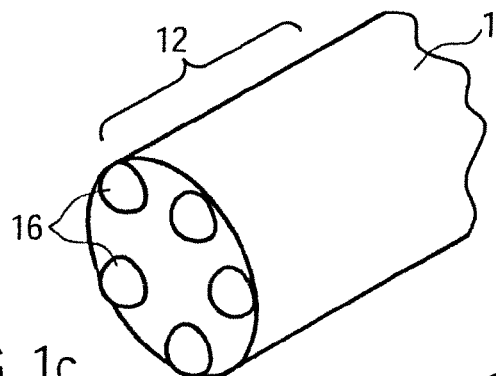

FIG. 1c) shows a stretch rod tip 12 in the case of which five hemispheres rise from the face side of the stretch rod in the direction of the longitudinal axis of the latter.

Figure 1D:
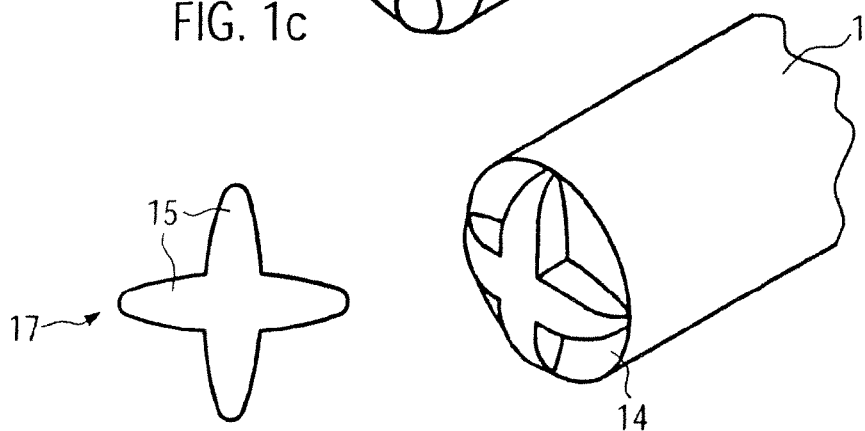

The stretch rod tip outlined in FIG. 1d) has at (especially) one location a cross-section 17 at right angles to the longitudinal axis of the stretch rod, which comprises four uniformly distributed radially outwardly extending fingers. The width of these fingers decreases in a radially outward direction. The corners and edges on the stretch rod tip are partially rounded in the example shown.

Figure 2A:
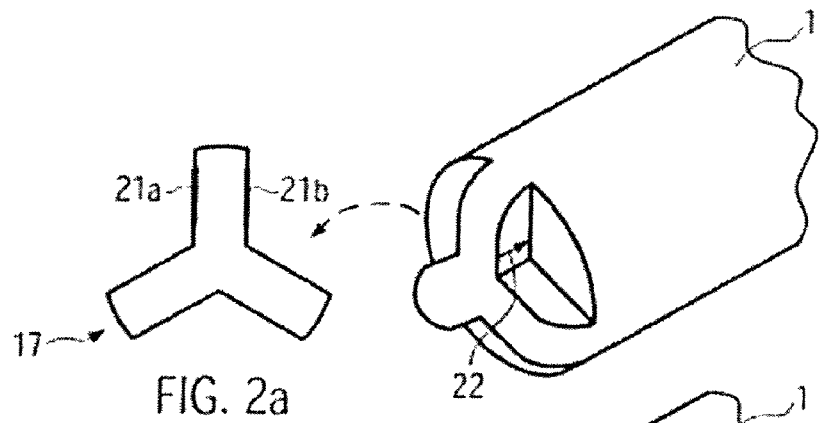
FIG. 2a), b) shows special types of possible recesses provided on the stretch rod tip.

In FIG. 2a), a stretch rod tip is outlined, which has a three-finger cross-section 17 at right angles to the longitudinal axis of the stretch rod. Each of said fingers has two parallel sides 21a and 21b.

The recesses on the tip have cut faces extending in a direction 22 parallel to the longitudinal axis of the stretch rod.

Figure 2B:
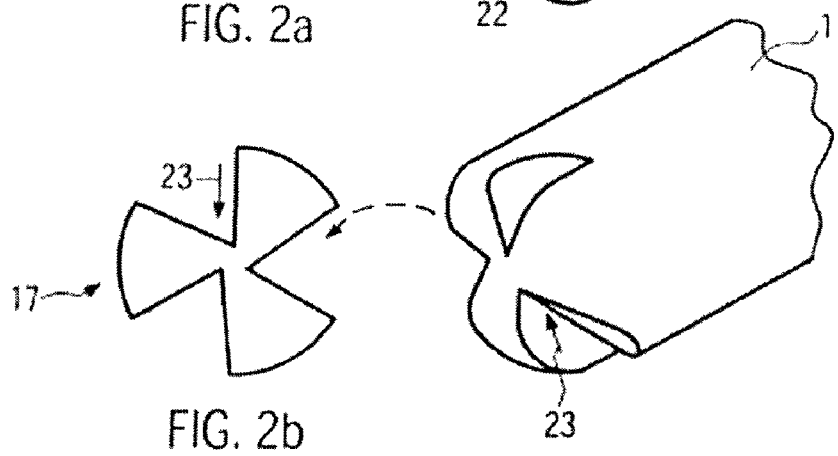

FIG. 2b) shows a stretch rod tip with recesses in the form of incisions in the case of which a few cut faces extend in a radial direction 23.

Figure 3:
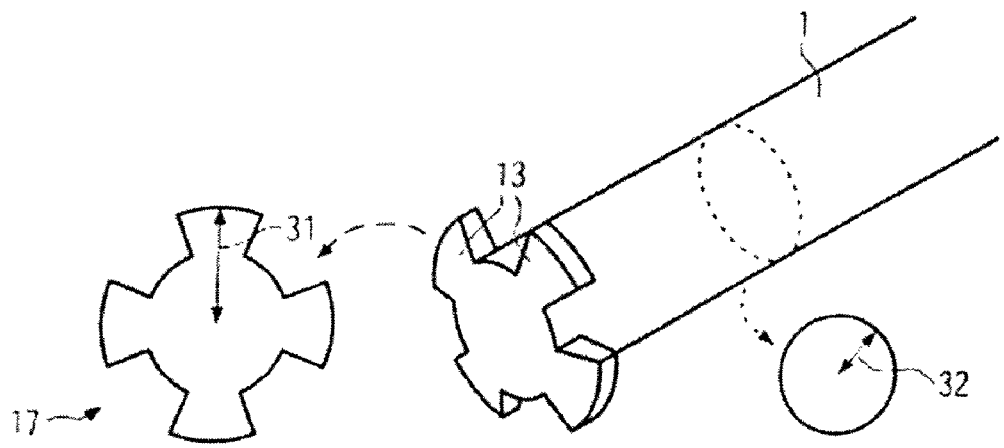
FIG. 3 shows a stretch rod tip with raised portions at right angles to the longitudinal axis of the stretch rod.

In FIG. 3 a stretch rod tip is shown, which deviates from the shape of a circular cylinder insofar as raised portions 13 are provided on the circumferential surface of the circular cylinder. It follows that the tip has at location a cross-section 17 whose maximum radial edge distance 31 is larger than the maximum radial edge distance 32 of a cross-section of the stretch rod at a location which is farther away from the end to be directed towards the preform.

Figure 4A:
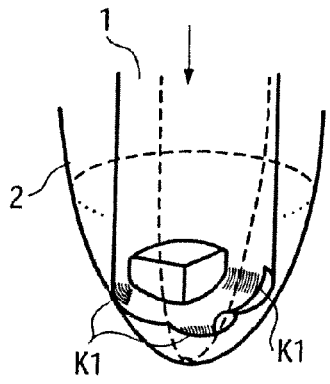
FIG. 4a) and b) shows a stretch rod tip which strikes on a preform at two moments, FIG. 4c) shows the respective view from below.
Figure 4B:
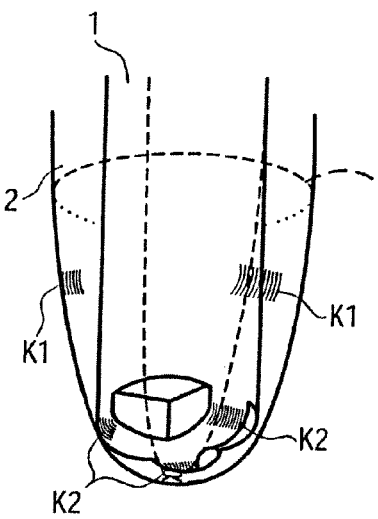
Figure 4C:
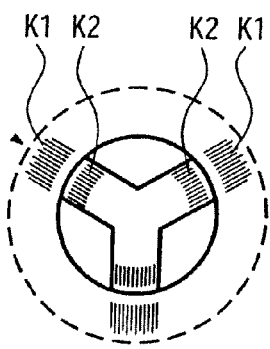

FIG. 4 shows how a stretch rod tip shaped according to FIG. 2 strikes on the concave inner side of a preform 2, said FIG. 4 showing two moments of the stretch rod insertion movement. The contact points K1 occurring at the earlier moment (FIG. 4a)) and the contact points K2 occurring at the later moment (FIG. 4b)) are marked. FIG. 4c) shows the preform and the stretch rod tip in a view from below. As can be seen, the contact points K1 migrated outwards in the course of the stretching process or in the course of the blowing process. This indicates that the preform material is stretched also in the area of the initial contact with the stretch rod tip and is not fixed or only fixed to a minor extent.

Figure 5A:
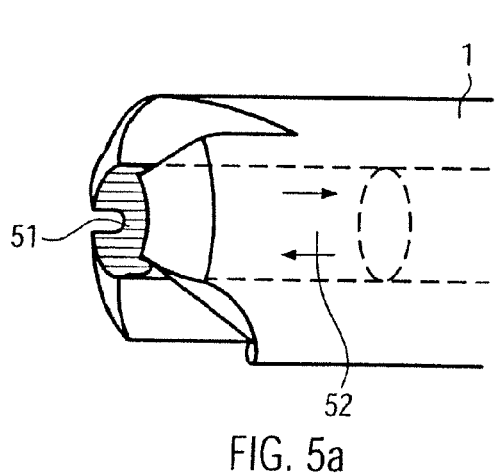
FIG. 5a), b) shows two variants of stretch rod tips in the case of which the space created by the recesses increases the length of a flow path extending in the interior of the stretch rod.
Figure 5B:
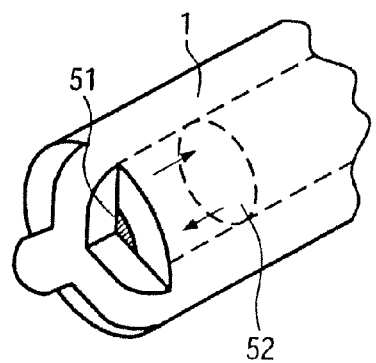

In FIGS. 5a) and b) stretch rod tips are outlined, which comprise one (FIG. 5a)) or three (FIG. 5b)) openings 51 of flow paths 52 extending in the interior of the stretch rod. When the tip has struck the preform, the space created by the recesses increases here the respective flow path by the piece delimited by the incision faces and the inner surface of the preform. The gas stream flowing through cools the preform material, which is still hot, in this area thus causing a faster stability of the then fully formed hollow body bottom.

Figure 6:
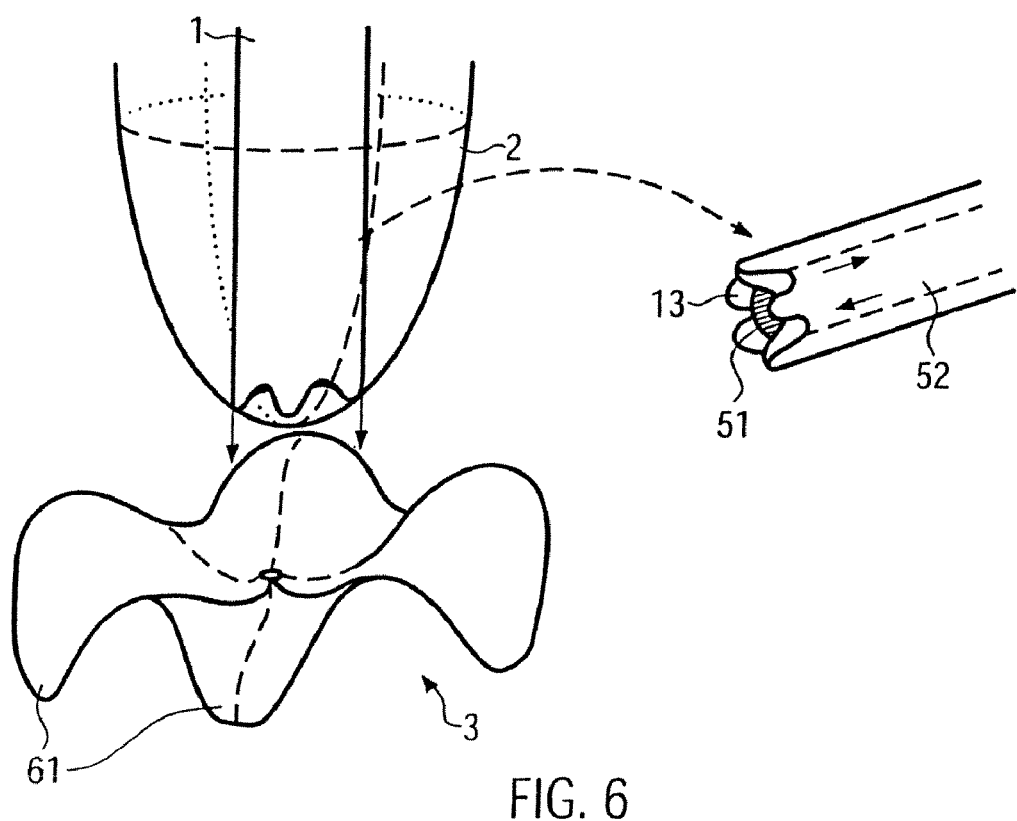
FIG. 6 shows an arrangement in which a stretch rod stretches a preform in the direction of a bottom mold and in which the recesses in the stretch rod tip are analogous to the bottom mold.

FIG. 6 shows the tip of a stretch rod 1 and a preform 2 stretched by means of said tip a short time before said preform comes into contact with a bottom mold 3. The shape of the stretch rod tip is adapted to said bottom mold insofar as the number (in this case five) of the raised portions 13 in the tip and the number of depressions 61 in the bottom mold or the number of recesses in the tip and the number of raised portions in the bottom mold correspond. When the stretch rod is introduced to such an extent that it presses the preform against the bottom mold, a comparatively uniform thickness of the pressed material is achieved due to the geometrical correspondence between the two pressure surfaces. A good material yield can thus be accomplished in this area. Furthermore, an inhomogeneity of material (e.g. with regard to thickness) resulting from the shape of the stretch rod tip and occurring on the circumference of the preform can e.g. also be utilized for accumulating a comparatively large amount of preform material in the area of the (lower) foot ends or in the area between two feet (reinforcements).

In the outlined example, a flow path 52 is additionally provided in the interior of the stretch rod, said flow path 52 being used for feeding or discharging compressed gas, and the interspaces created by the recesses cause, when they come into contact with the preform, an extension of the flow path with the above-described effect.

An apparatus for producing hollow bodies comprises a blow molding station in which at least one previously heated preform is inserted in a mold and stretched by introducing a stretch rod. The apparatus additionally comprises an equipment by means of which a positive pressure difference is generated between the interior and the exterior of the preform (e.g. by feeding in gas); this pressure difference leads to maximum spreading of the preform in the mold in question. Such an apparatus is not fully shown in any of FIG. 1 to 6. The respective figures only show a few possible versions of the stretch rod tip, which is of importance to the present invention, some of said figures showing the stretch rod tip in combination with the contacted preform 2 (FIG. 4*a-c* and FIG. 6), and others show it in combination with a bottom 3 of the (cavity) mold (FIG. 6).

A method of producing hollow bodies comprises heating (at least) one preform, inserting it in a mold, generating a pressure difference in the way described hereinbefore, and introducing a stretch rod in the preform contained in the mold. The method may also comprise the possibility of effecting pressure compensation (after maximum spreading of the preform within the mold) through flow paths in the interior of the stretch rod. In the method concerning the present invention the stretch rod tip has a geometry of the type described hereinbefore.

The invention claimed is:

1. A stretch rod used for forming a preform into a hollow body, comprising a stretch rod tip being the stretch rod end which is to be directed towards the preform, and provided in its surface with a plurality of one of raised portions, recesses, and a combination thereof relative to a the circular cylinder shape, whereby the stretch rod can come into contact with the concave inner surface of the preform at a plurality of locations which are separated from one another by non-contacting portions, wherein the stretch rod tip has provided therein one or a plurality of openings of only a single flow path which extends through the interior of the stretch rod and via which gas can be one of fed in or discharged through the stretch rod, and wherein one of the space between the raised portions or the space created by the recesses increases the length of the flow path beyond the opening or openings.

2. A stretch rod according to claim 1, wherein the stretch rod tip has at a location a polygonal cross-section at right angles to the longitudinal axis of the stretch rod.

3. A stretch rod according to claim 1, wherein the stretch rod tip has at a location across-section, at right angles to the longitudinal axis of the stretch rod, whose area comprises one of two, three, four, five, six, seven, eight, nine or more one of regularly or irregularly arranged fingers.

4. A stretch rod according to claim 3, wherein the fingers extend radially outwardly.

5. A stretch rod according to claim 3, wherein each finger has at least partially two parallel sides.

6. A stretch rod according to claim 5, wherein the two parallel sides are at the outer end of each finger.

7. A stretch rod according to claim 1, wherein the stretch rod tip is provided in its surface with a plurality of raised portions relative to the circular cylinder shape, wherein some or all of the raised portions have the shape of one of hemispheres, beads, projections, or combinations thereof.

8. A stretch rod according to claim 1, wherein some or all of the recesses have the shape of one of incisions, grooves or holes.

9. A stretch rod according to claim 1, wherein the recesses relative to the circular cylinder shape are created by one of incisions or portions in such a way that at least one cut face extends in a direction one of parallel to the longitudinal axis of the stretch rod, in a radial direction, or a combination thereof.

10. A stretch rod according to claim 9, wherein the radial direction is in a direction towards the longitudinal axis of the stretch rod.

11. A stretch rod according to claim 10, wherein the edges and corners of the stretch rod tips are rounded that are to come into contact with the concave inner surface of the preform.

12. A stretch rod according to claim 1, wherein the stretch rod tip has at a location a cross-section whose maximum radial edge distance to the longitudinal axis of the stretch rod is larger than the radial edge distance of at least one cross-section of that remaining part of the stretch rod without the tip.

13. A stretch rod according to claim 1, wherein the stretch rod tip has edges and corners, and some or all of the edges and corners of the stretch rod tip are rounded.

14. An apparatus for forming preforms into a hollow body, comprising a stretch rod formed according to claim 1.

* * * * *